Sept. 29, 1942.     H. SCHMIDBERGER     2,297,505
METHOD FOR THE OPERATION OF FULLY AUTOMATIC
PRESSES FOR ARTIFICIAL SUBSTANCE
Filed May 28, 1940
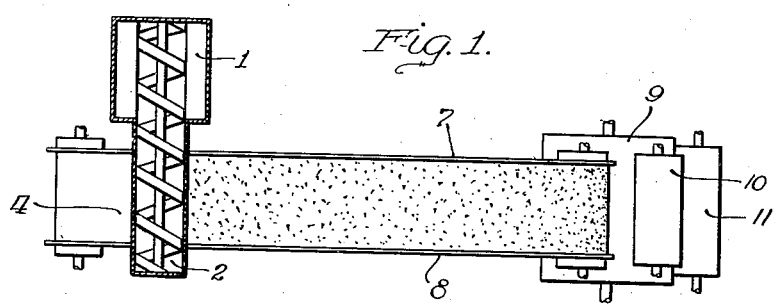
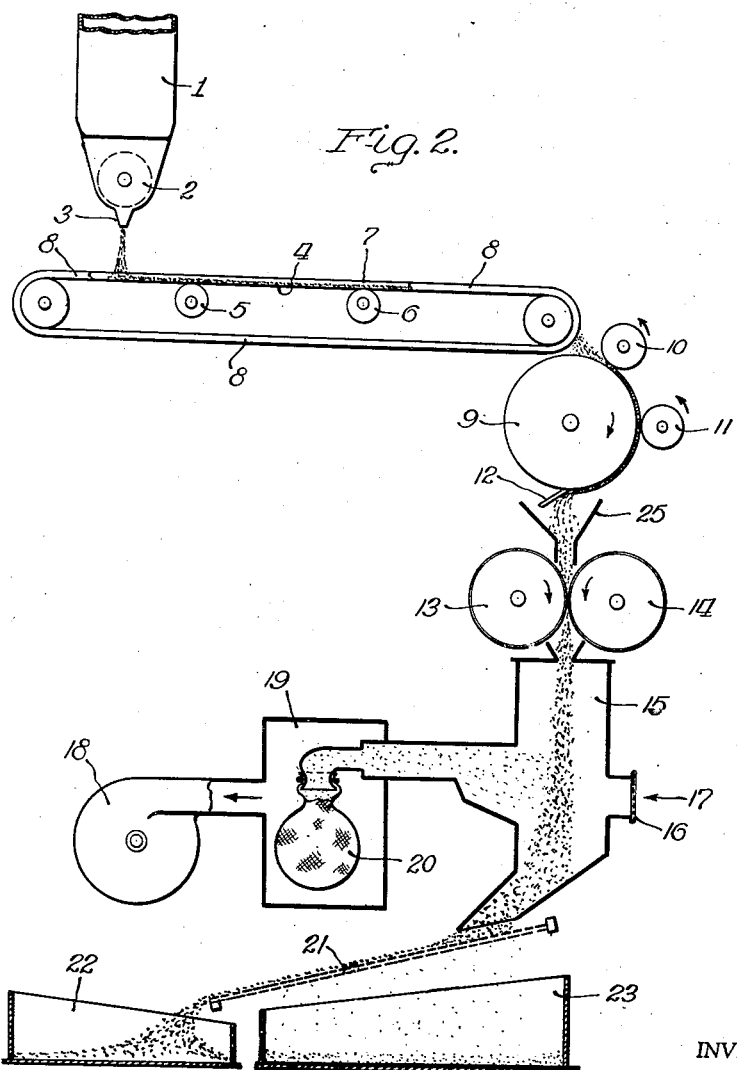
INVENTOR.
BY Heinrich Schmidberger
Richardson & Auer
Attys.

Patented Sept. 29, 1942

2,297,505

UNITED STATES PATENT OFFICE 2,297,505

METHOD FOR THE OPERATION OF FULLY AUTOMATIC PRESSES FOR ARTIFICIAL SUBSTANCE

Heinrich Schmidberger, Vienna, Germany; vested in the Alien Property Custodian

Application May 28, 1940, Serial No. 337,673
In Germany April 29, 1939

3 Claims. (Cl. 18—48)

The present invention relates to improvements in or relating to the manufacture of artificial moulding materials and articles made therefrom.

The initial material for the manufacture of moulded articles from urea derivatives, phenol condensation products or other artificial resins, is usually in the form of a powder. This powder is filled into the molds by means of suitable charging devices and then subjected to a strong pressure with simultaneous application of heat until it begins to flow in the mould and fills it evenly. The press material is then solidified, the mould is opened and the pressed article ejected.

It has previously been proposed to carry out these consecutive steps automatically and it might have been thought that the construction of machines for such a purpose would present no fundamental difficulties. Such machines have, however, not proved entirely satisfactory in practice because they were subject to frequent stoppages and interruptions in working. The troubles are generally caused by the jamming of one or the other of the mechanical parts of the machine. Thorough investigations have led to the conclusion that nearly all the stoppages and interruptions can be traced to the moulding powder which settles as a fine dust in slots, bearings, guides and the like. These mechanical parts become smeared with and jammed by the heated powder which hardens in or on them. Semi-automatic operation has therefore been resorted to in which the operator must continually clean the important working parts with brushes, compressed air and the like so as to free them from all traces of the powdered moulding material.

It is an object of the invention to remove the above mentioned difficulties encountered in the operation especially of completely automatic machines.

According to the present invention I provide a method of moulding artificial materials especially in a completely automatic moulding press in which I employ an initial material in granular form substantially free from powder.

The preparation of artificial materials such as synthetic resins in granular form is known. The artificial material may be applied, if desired, in powder form to heated rollers on which it is warmed sufficiently so that it softens and forms a cohesive layer which may be removed by suitable stripping means and broken up to granules of grain size of approximately 0.5 mm. to 3 mm. in diameter. Such granules, however, are found to contain a considerable proportion of fine dust-like constituents of particle size of about 0-1 mm. and less in diameter. Such constituents must be removed before the material can be employed for carrying out the new method.

According to the present invention I provide a method of manufacturing moulding material especially of synthetic resins including the steps of forming the material into granular form and removing therefrom powder, dust and the like. It is preferable to remove substantially all particles which can pass through a 0.1 mm. mesh or better all those which can pass through a 0.5 mm. mesh.

The removal of the dust-like particles may be effected by sifting or screening or preferably by winnowing or like pneumatic separation.

The dust-like particles which are removed may be treated to produce granules, if desired, after mixture with further quantities of material, so that any substantial waste is avoided. The coarse grains of the granular material may easily be kept from contaminating bearings, guides or other working parts of the press.

The new process may be carried out by the use of apparatus such as indicated in the accompanying drawing, wherein Fig. 1 shows a diagrammatic partially sectional top plan view; and Fig. 2 shows a diagrammatic side view of the apparatus involved.

The initial material is supplied to the hopper 1 in the form of a fine powder, in cold condition, and is fed by means of the screw 2 to a slot-shaped nozzle or opening at 3 from which it is ejected and drops on the conveyor 4. The latter may be a belt conveyor with a suitable drive to move the material toward the rolls 9, 10 and 11. The belt 4 is provided at its edges with projecting strips 7 and 8 to prevent lateral spilling of the material. Eccentrically mounted rotating cams 5 and 6 vibrate the belt 4 to loosen up and distribute the material evenly upon its surface. The material is thus conveyed to the right, as seen in the drawing, and drops upon the rotating roll or drum 9 which is suitably heated so as to obtain a softening and baking of the material on its surface. Pressure rolls 10 and 11 press and distribute the softened heated material upon the drum 9 so as to produce an even layer thereon which is about 0.5-1 mm. thick. This layer is peeled off from the drum 9 by means of a stripping knife 12 and drops downwardly in somewhat plate-shaped pieces through the guide channel 25 and into the space between the grooved rolls 13-14 which form the desired granulate.

Dust-like particles are a normal constituent part of the granulate. In order to remove such dust-like constituents the granulate is fed to a suitable pneumatic separator 15, as shown in the drawing. Air is supplied into the separator over a screen or filter 16 in the direction of the arrow 17, and is drawn off due to the action of the fan 18. The dust-like material is deposited in the dust bag 20. The granulate then drops upon an inclined screen 21 and moves downwardly into the collector container 22. The screen 21 is preferably vertically vibrated. Residual dust particles contained in the granule are deposited in the collector 23.

The dust bag 20 and the collector 23 are periodically emptied and the dust-like material thus collected may be used in semi-automatic presses, as usual, or may be re-circulated together with new material over the belt 4. The screen 21 may not be absolutely necessary. As an alternative it is possible to dispense with the separator 15 by suitably constructing the screen 21 and making it of sufficient length to screen out the dust-like constituents as desired. However, the described arrangement, which requires relatively little space, has been found to furnish the best results.

By employing the new process completely automatic operation in the mass production of buttons, knobs or the like, articles from urea phenol and like condensation products may be carried out without close supervision of the charging and pressing operations and without the interruptions and stoppages which previously occurred.

The material made and used according to the present invention may be employed in any kind of moulding press, mould and the like, and any suitable means may be provided for filling the press moulds.

I claim:

1. Method for preparing artificial material of use in fully automatic presses, consisting in taking said material in powdered condition, forming therefrom a granulate which contains dust-like particles as a normal constituent part thereof, and removing from said granulate dust-like constituents of a grain size less than 0.1 mm.

2. In the art of producing moulded articles from artificial initially powder-like material such as urea derivatives and the like, wherein said material is pretreated to form a granulate which contains dust-like particles as a constituent part thereof, the method of preparing said granulate for use in fully automatic presses wherein said articles are produced, consisting in pneumatically treating said granulate to remove therefrom dust-like constituents of a grain size less than 0.1 mm.

3. In the art of producing moulded articles from initially powder-like material such as artificial resin and the like, wherein said material is pretreated to form a granulate of a grain size of approximately 0.5 mm. to 3 mm. which contains dust-like particles as a constituent part thereof, the method of applying said granulate, comprising the steps of first removing therefrom dust-like particles of a grain size less than 0.1 mm., and then feeding said de-dusted granulate into a fully automatic press wherein said articles are produced.

HEINRICH SCHMIDBERGER.